United States Patent
Gjermshus et al.

(10) Patent No.: US 11,689,532 B2
(45) Date of Patent: Jun. 27, 2023

(54) METHOD FOR USING OPENID CONNECT TO MANAGE ACCESS TO DATA WITH RIGHTS GRANTED BY MULTIPLE AUTHENTICATION PROVIDERS

(71) Applicant: Sonitor Technologies AS, Oslo (NO)

(72) Inventors: Per Kristian Gjermshus, Oslo (NO); Džiugas Baltrūnas, Oslo (NO); Tommy Svendsen, Oslo (NO)

(73) Assignee: Sonitor Technologies AS, Oslo (NO)

( * ) Notice: Subject to any disclaimer, the term of this patent is extended or adjusted under 35 U.S.C. 154(b) by 0 days.

(21) Appl. No.: 16/587,545

(22) Filed: Sep. 30, 2019

(65) Prior Publication Data

US 2021/0099456 A1    Apr. 1, 2021

(51) Int. Cl.
*H04L 29/06*     (2006.01)
*H04L 9/40*      (2022.01)

(52) U.S. Cl.
CPC .......... *H04L 63/102* (2013.01); *H04L 63/083* (2013.01); *H04L 63/108* (2013.01)

(58) Field of Classification Search
CPC ... H04L 63/102; H04L 63/083; H04L 63/108; H04L 63/0884; H04W 12/084
USPC .......................................................... 726/4
See application file for complete search history.

(56) References Cited

U.S. PATENT DOCUMENTS 9,462,044 B1 * 10/2016 Preibisch ............ H04L 63/0823
9,565,218 B2 *  2/2017 Gangadharan .......... H04L 67/55
10,855,669 B2 * 12/2020 Shaw .................. H04L 63/0815
11,411,871 B2 *  8/2022 Goyal ..................... H04L 69/22
2015/0350186 A1 * 12/2015 Chan .................. H04L 63/0815
                                                          726/9
2019/0097802 A1   3/2019 Rowe et al.
2019/0372962 A1 * 12/2019 Maria ..................... G06F 21/41
2020/0136825 A1 *  4/2020 Gupta .................. H04L 9/3213

FOREIGN PATENT DOCUMENTS

WO    WO 2017/066688 A1    4/2017
WO    WO 2018/053122 A1    3/2018

OTHER PUBLICATIONS

A JSON Token-Based Authentication and Access Management Schema for Cloud SaaS Applications, Ethelbert et al, Aug. 2017 (Year: 2017).*
International Search Report dated Jan. 18, 2021 for Appl. No. PCT/IB2020/059173, 4 pages.
Written Opinion dated Jan. 18, 2021 for Appl. No. PCT/IB2020/059173, 7 pages.
Dodanduwa et al., "Trust-based identity sharing for token grants," Proceedings of the 3rd International Conference on Cryptography, Security and Privacy (ICCSP '19), Association for Computing Machinery, Jan. 2019, pp. 168-173.

* cited by examiner

*Primary Examiner* — Jahangir Kabir
(74) *Attorney, Agent, or Firm* — Sterne, Kessler, Goldstein & Fox P.L.L.C.

(57) ABSTRACT

An approach to allow cloud-based positioning systems to use their own identity provider. An extra field is included in a token that is used to look up the identity provider for token verification for each user. Each access claim of the access token is checked for invalidity. If no invalid claims are found, accepting the authorization request. If an invalid claim is found, rejecting the authorization request.

22 Claims, 4 Drawing Sheets

METHOD FOR USING OPENID CONNECT TO MANAGE ACCESS TO DATA WITH RIGHTS GRANTED BY MULTIPLE AUTHENTICATION PROVIDERS

FIELD

The present disclosure relates generally to access management systems and more particularly to access management systems for use with multiple authentication providers.

BACKGROUND

In the modern economy, information access only by authorized users is essential to the safeguarding of digital assets. Authorization to servers and web sites includes authentication of prospective users to those servers and web sites. Each server and web site may have its own proprietary authentication approach, but this rapidly leads to a proliferation of authentication approaches (e.g., many passwords).

Third party authentication services may be used to authenticate a user across multiple servers and web sites. For example, OpenID is an approach to the identification of a user, irrespective of which web site they visit. The advantage of OpenID is that web sites that take advantage of OpenID need not ask for the same information over and over again. A user gives the password only to the OpenID provider, and then the OpenID provider assures the identity of the user to the server and/or website that the user is visiting. No server and/or website other than the OpenID provider ever sees the user's password. Thus, a user does not have the concern of an insecure server or website compromising his/her identity.

SUMMARY

In an embodiment of the present disclosure, a method of authorization request includes receiving, from a client, an access token, and validating the access token using keys obtained from a JSON Web Token (JWT) key set of an identity provider. The method further includes checking the audience of the access token for a matched expectation, and checking each access claim of the access token for invalidity. In addition, the method includes if any of the access claims are invalid, failing the authorization request, but if no invalid claims are found, accepting authorization request.

BRIEF DESCRIPTION OF THE DRAWINGS

The accompanying drawings, which are incorporated herein and form a part of the specification, illustrate embodiments of the present disclosure and, together with the description, further explain the principles of the disclosure and enable a person skilled in the pertinent arts to make and use the embodiments.

DETAILED DESCRIPTION

Figure 1:
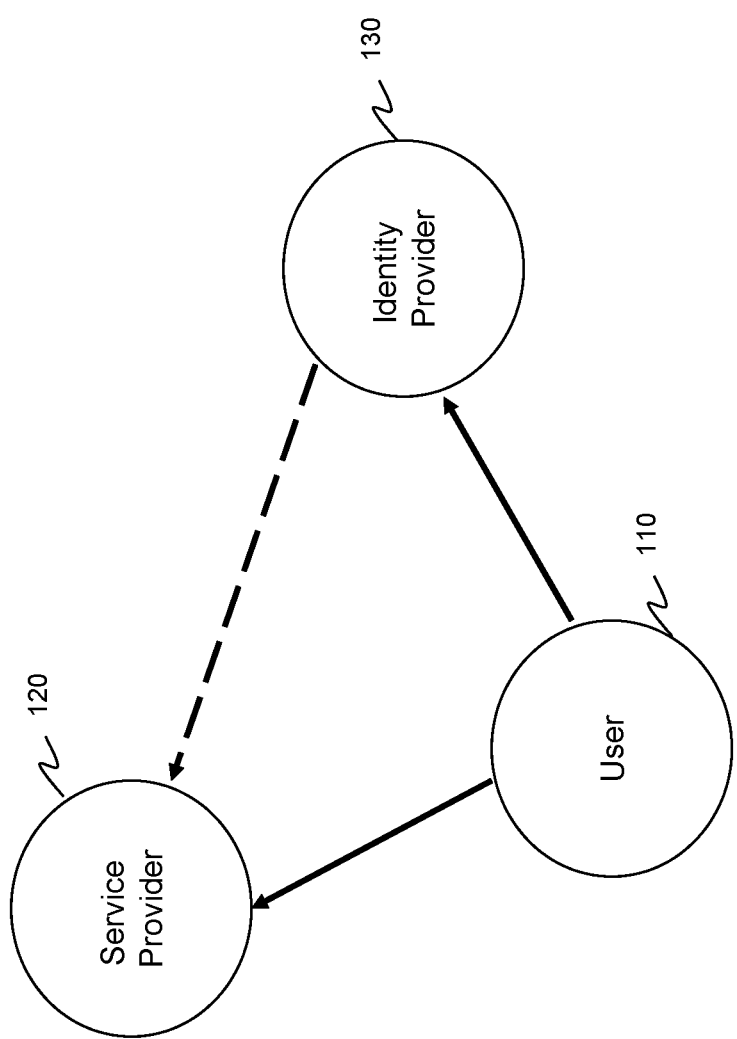
FIG. 1 illustrates a framework of an authentication process, according to example embodiments of the present disclosure.

The present disclosure will be described with reference to the accompanying drawings. In the drawings, like reference numbers indicate identical or functionally similar elements. Additionally, the left-most digit of a reference number identifies the drawing in which the reference number first appears.

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described may include a particular feature, structure, or characteristic, but every exemplary embodiment does not necessarily include the particular feature, structure, or characteristic. Moreover, such phrases do not necessarily refer to the same exemplary embodiment. Further, when the disclosure describes a particular feature, structure, or characteristic in connection with an exemplary embodiment, those skilled in the relevant arts will know how to affect such feature, structure, or characteristic in connection with other exemplary embodiments, whether or not explicitly described.

The exemplary embodiments described herein provide illustrative examples and are not limiting. Other exemplary embodiments are possible, and modifications may be made to the exemplary embodiments within the spirit and scope of the disclosure. Therefore, the Detailed Description does not limit the disclosure. Rather, only the below claims and their equivalents define the scope of the disclosure.

Hardware (e.g., circuits), firmware, software, or any combination thereof may be used to achieve the embodiments. Embodiments may also be implemented as instructions stored on a machine-readable medium and read and executed by one or more processors. A machine-readable medium includes any mechanism for storing or transmitting information in a form readable by a machine (e.g., a computing device). For example, in some embodiments a machine-readable medium includes read-only memory (ROM); random-access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that the actions result from computing devices, processors, controllers, or other devices executing the firmware, software, routines, and/or instructions.

Any reference to the term "module" shall be understood to include at least one of software, firmware, and hardware (such as one or more circuit, microchip, or device, or any combination thereof), and any combination thereof. In addition, those skilled in relevant arts will understand that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following detailed description of the exemplary embodiments will fully reveal the general nature of the disclosure so that others can, by applying knowledge of those skilled in relevant arts, readily modify and/or customize for various applications such exemplary embodiments, without undue experimentation and without departing from the spirit and scope of the disclosure. Therefore, such modifications fall within the meaning and plurality of equivalents of the exemplary embodiments based upon the teaching and guidance presented herein. Here, the phraseology or terminology serves the purpose of description, not limitation, such that the terminology or phraseology of the present specification should be interpreted by those skilled in relevant arts in light of the teachings herein.

As noted above, information access only by authorized users is essential to the safeguarding of digital assets. A cloud service provider is an example of a provider of digital services for which proper authorization and authentication is particularly important. In a cloud service provider, data may be stored on behalf of multiple organizations. While each of these separate organizations controls their own individual users, each of these organizations would want to give access to certain data elements in the cloud service without exposing the user database of each organization to the cloud service provider.

As also noted above, one approach for identity provision by third parties is through OpenID. In the standard way of deploying OpenID there is one or a limited number of trusted identity providers configured for a particular application. This means that all authentication tokens can be verified by using the well-known configuration of the identity provider (or of the limited number of trusted identity providers), by looking them up using the issuer field in the token.

However, not all users of a particular service provider will want to use the same identity provider. In particular, a user may need to register with multiple identity providers. For example, a user may need to register with multiple identity providers, even when using the same service provider. Such a circumstance arises, for example when a service provider provides services to multiple environments where each environment uses a different identity provider. An example of such a circumstance is when the service provider provides real-time location services for multiple facilities. A particular user may visit two or more facilities (e.g., hospital, university campus) and seek to be identified at each of the two or more facilities for purposes of receiving real-time location services. The present OpenID connect approach does not permit a diversity of identity providers associated with one or more users to work with a single service provider.

Recognizing this problem in the identification space, the inventors devised an approach to permit multiple users to use more than one identity provider, while still being able to obtain the desired services from a particular service provider. In a particular embodiment of the present approach, the desired service is a real-time location based service that is made available at a number of facilities, when each user is identified at those facilities. In the discussion that follows, real-time location based services is used as an embodiment, although persons of ordinary skill in the art would recognize that the same approach may be used with other services, and associated service providers.

In devising an approach to permit multiple users to use their own identity provider, while still being able to obtain the desired services, the approach needs to provide a means of knowing which identity provider a token should be verified against. This is done by requiring that an extra claim is included in the token and this claim is then used to look up which identity provider to use for token verification. In addition, the approach needs to verify that the accessed data element is associated with the identity provider used in the token.

FIG. 1 illustrates a framework of an authentication process, in accordance with example embodiments of the present disclosure. User 110 attempts to log into, or secure access to services from, service provider 120. Service provider 120 requires identification verification of user 110. To achieve this, service provider 120 redirects user 110 to identity provider 130. User 110 enters its verification information into identity provider 130, which if correct, authenticates user 110 to service provider 120. User 110 then obtains the desired services from service provider 120. This is a simple illustration of an embodiment of the present disclosure, with one user and one identity provider, although one of ordinary skill in the art would understand that more than one user falls within the scope of the present disclosure.

Figure 2:
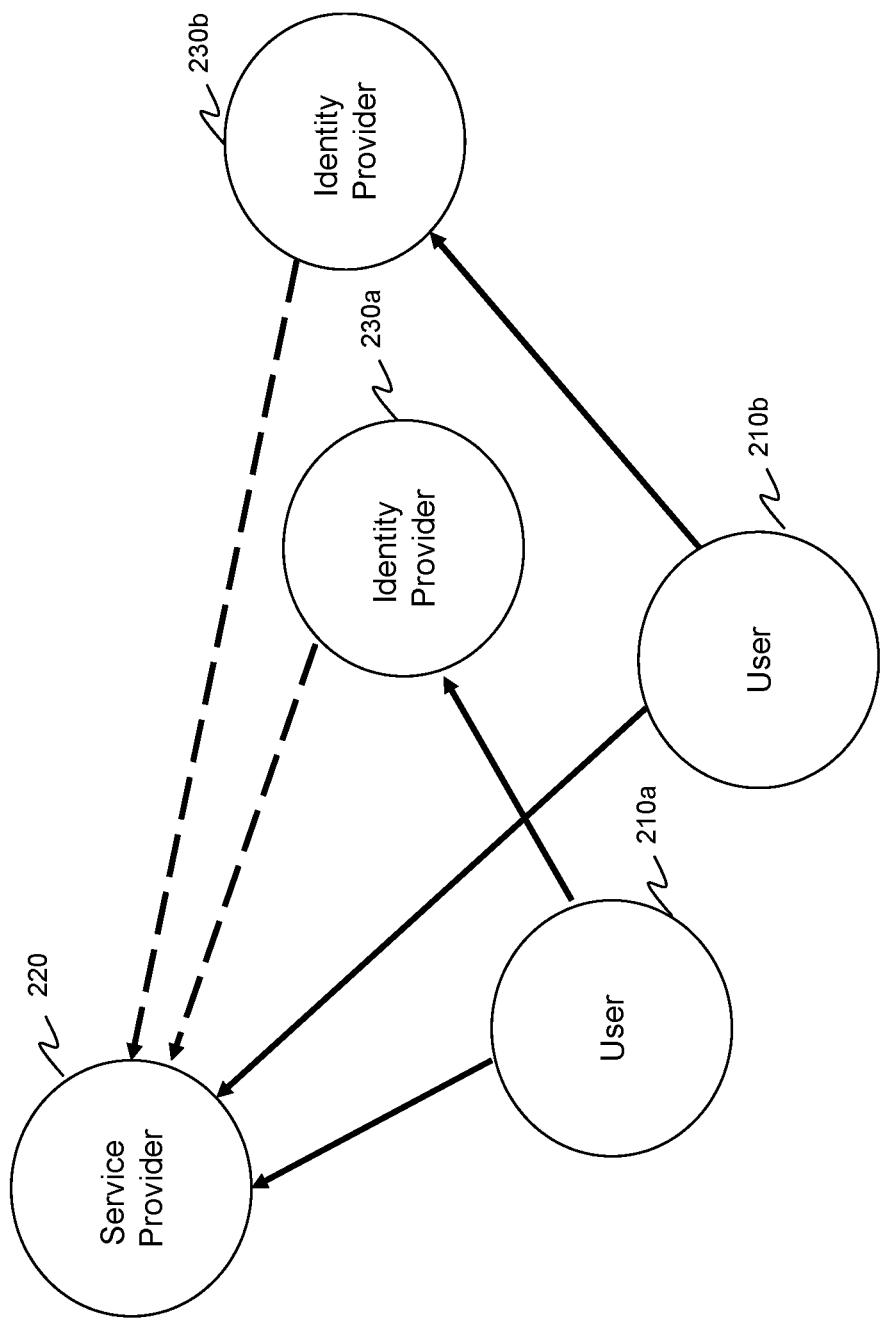
FIG. 2 illustrates another framework of an authentication process, according to further example embodiments of the present disclosure.

FIG. 2 provides another illustration of an authentication process with multiple users and multiple identity providers, according to example embodiments of the present disclosure. It should be noted that two or more identity providers are not required to receive the benefits of various aspects of the present disclosure. In this illustration, there are two users 210a, 210b. User 210a attempts to log into, or secure access to services from, service provider 220. Service provider 220 requires identification verification of user 210a. To achieve this, service provider 220 redirects user 210a to identity provider 230a, which is the identity provider in use by user 210a. User 210a enters its verification information into identity provider 230a, which if correct, authenticates user 210a to service provider 220. User 210a then obtains the desired services from service provider 220. Similarly, user 210b may also be identified for purposes of receiving services from service provider 220. User 210b attempts to log into, or secure access to services from, service provider 220. Service provider 220 requires identification verification of user 210b. To achieve this, service provider 220 redirects user 210b to identity provider 230b, which is the identity provider in use by user 210b. User 210b enters its verification information into identity provider 230b, which if correct, authenticates user 210b to service provider 220. User 210b then obtains the desired services from service provider 220. Dashed lines are shown connecting identity providers 230a, 230b and service provider 220 in that the connections are implicit connections (based on previous trust), rather than an actual data connection performed at authentication time.

Every data element is associated with one or more identity providers. An identity provider is an OpenID Connect provider, or issuer, and is identified by an issuer URI that in turn is a pointer to the Authorization Server. The requirements of the Authorization Server include:

1. /.well-known/openid-configuration must be a supported Provider Configuration endpoint for the authorization server (i.e., if the issuer URI is https://idp.example.com/, then https://idp.example.com/.well-known/openid-configuration must be a valid endpoint).

2. The authorization server must be able to issue JSON Web Token (JWT) tokens that are of "Bearer" OAuth Access Token Type.

The access token requirements include:
1. The access token must be of JWT Bearer OAuth Access Token Type.
2. The access token must include the following claims:

| Type | Name | Description |
| --- | --- | --- |
| Registered | sub | Arbitrary user identifier |
| Registered | aud | The value must be equal or contain a link to the service provider, e.g., https://www.service_prov.com/. |
| Registered | exp | Token expiration time that is in the future. |
| Registered | iss | OpenID Connect issuer URI, matching the one retrieved from the Provider Configuration endpoint. |
| Private | https://www.service_prov.com/idp | Allocated numeric authentication provider identifier, as for example in a user interface of a service provider. |
| Private | https://www.service_prov.com/access | If this claim is present, it gives the user access to all data elements where the authentication provider is allowed to give access. The value of this claim is currently reserved and must be an empty JSON object. |
| Private | https://www.service_prov.com/access/dataElement/{dataElementId} | If this claim is present, it gives the user access to the given dataElementId. The value of this claim is currently reserved and must be an empty JSON object. |
| Private | https://www.service_prov.com/access/org/{organizationId} | If this claim is present, it gives the user access to all data elements owned by the given organizationId. |

An exemplary code implementation is provided below, with line numbers:

```
1   {
2       "header": {
3           "typ": "JWT",
4           "alg": "RS256",
5           "kid": "MjNBM0E1NzhENTRENkI3Njc4RkFFMDJGM0E4M0YzQTU"
6       },
7       "payload": {
8           "https://www.serv_prov.com/idp": 5747976207073280,
9           "https://www.serv_prov.com/access/org/56315271": { },
10          "https://www.serv_prov.com/access/dataElement/562949": { },
11          "https://www.serv_prov.com/access/dataElement/563650": { },
12          "https://www.serv_prov.com/access/dataElement/563853": { },
13          "iss": "https://www.serv_prov.com/",
14          "sub": "auth0|5c545a0b75eb02096fdc3606",
15          "aud": [
16              "https://www.serv_prov.com",
17              "https://www.serv_prov.com/userinfo"
18          ],
19          "iat": 1556623634,
20          "exp": 1556630834,
21          "azp": "dMIiMhw1ax3Lw85oF1PjZgVdsJ64fGAs",
22          "scope": "openid email"
23      },
24      "signature": "s-27M98fF9b36fiElryt-GNhF2cbV3Gefc3cc1DzuqoT
25  }
```

Remarks on the above lines of exemplary code implementation are as follows:

Line 8 says that this token was issued by the authentication provider that is registered with 5747976207073280 numerical identifier.

Line 9 says that the subject auth0|5c545a0b75eb02096fdc3606 can access all data elements owned by the organization 56315271.

Lines 10-12 say that the subject auth0|5c545a0b75eb02096fdc3606 can access the data elements 562949, 563650, and 563853.

An exemplary algorithm for verification of access rights is as follows. When receiving a token from a client, the following verifications are done:
1. The value of the claim "https://www.service_provider.com/idp" is used as a key in a database to find the identity provider who has issued the token.
2. The authenticity and integrity of the access token is validated using keys obtained from the identity provider's JWT key set.
3. The audience of the token is checked to see that it matches what is expected.
4. The access claims are checked as follows:

a. All organization claims are for an organization that the idp has authority to grant access to;
b. All data elements claims are for an data element that the idp has authority to grant access to;
c. If no invalid claims are found, the token is accepted and used for further access decisions (standard JWT processing); and
d. If invalid claims are found, the authorization fails and no access to the resource is granted.

As the above example illustrates, access may be provided in varying levels of granularity. For example, the claim element https://www.service_prov.com/access provides wild card access, i.e., to all data elements that the authentication provider is allowed to give access. Another claim element may provide a low level of granularity in that access is provided only to "dataElementId." Furthermore, another claim element may provide an intermediate level of granularity in that access is provided to all data elements owned by a given organization, e.g., organizationId. This hierarchy of access may be used to avoid lengthy tokens, which would otherwise be necessary to describe every access owned by a given organization. Such a hierarchy is useful in, for example, a multi-corporate campus (e.g., two or more companies renting separate portions of the campus) serviced by one security company. Security personnel would likely be granted access to the entire campus, while employees of one company would have access only to the buildings rented by this company. Employees of a second company would have access to their separate buildings, but not access to the buildings rented by the first company. Finally, employees in the first company with a limited role may have access only to one of the buildings, commensurate with their employment role.

Figure 3:
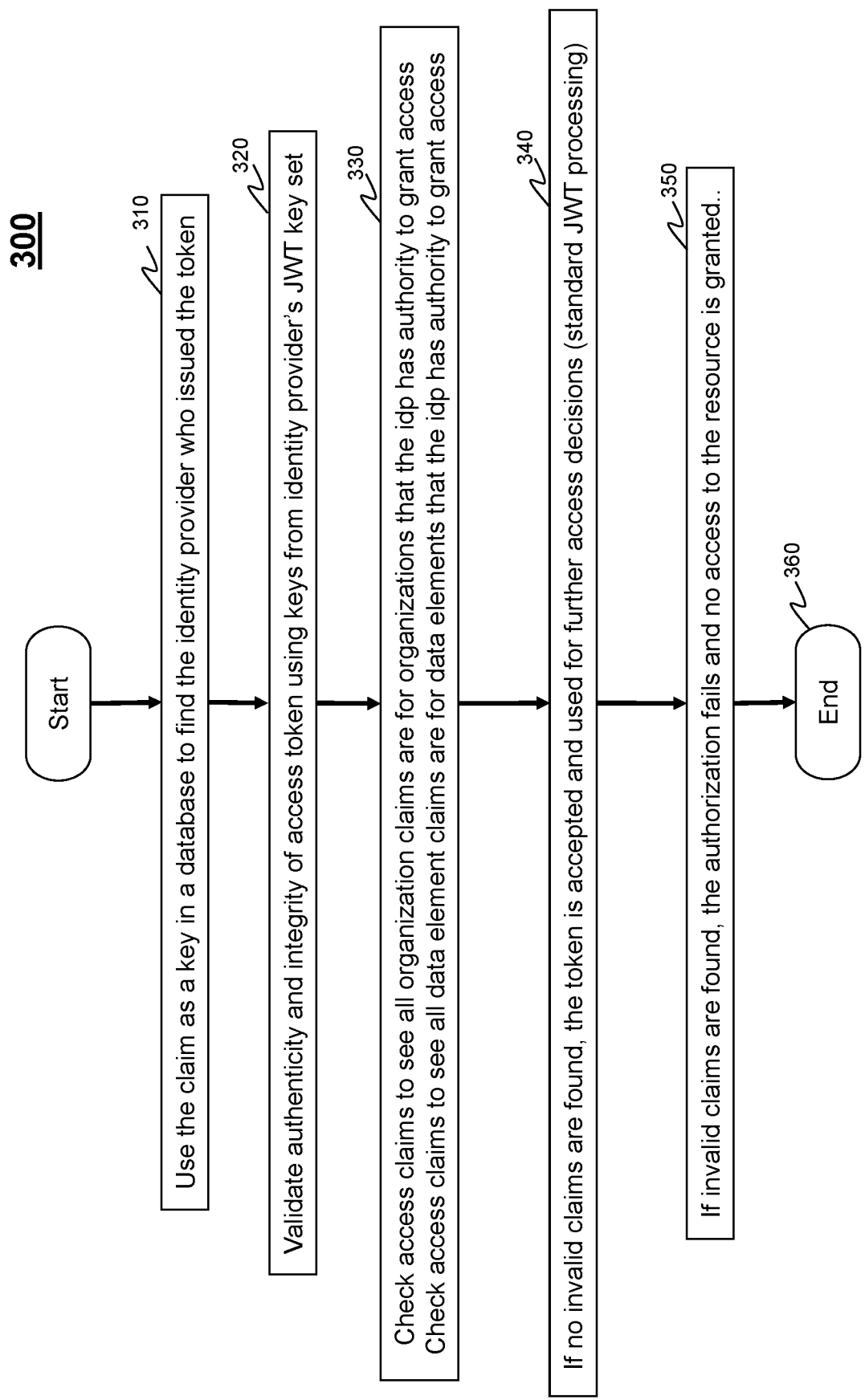
FIG. 3 illustrates an algorithm of an authentication process, according to example embodiments of the present disclosure.

FIG. 3 illustrates the above exemplary method 300 of an authentication process. Method 300 begins at step 310. In step 310, a claim element is used as a key in a database to find the identity provider who issued the token. In the above example, the claim "https://www.service_provider.com/idp"

In step 320, the authenticity and integrity of the access token is validated using keys from the identity provider's JWT key set.

In step 330, the access claims are checked. All organization claims are checked for organizations that the idp has authority to grant access. All data element claims are checked for data elements that the idp has the authority to grant access.

Based on the checks in step 330, in step 340, if no invalid claims are found, the token is accepted and used for further access decisions (standard JWT processing).

Based on the checks in step 330, in step 350, if invalid claims are found, the authorization fails and no access to the resource is granted. In an alternative embodiment, selective access is provide based on those access claims for which access authority has been granted.

Figure 4:
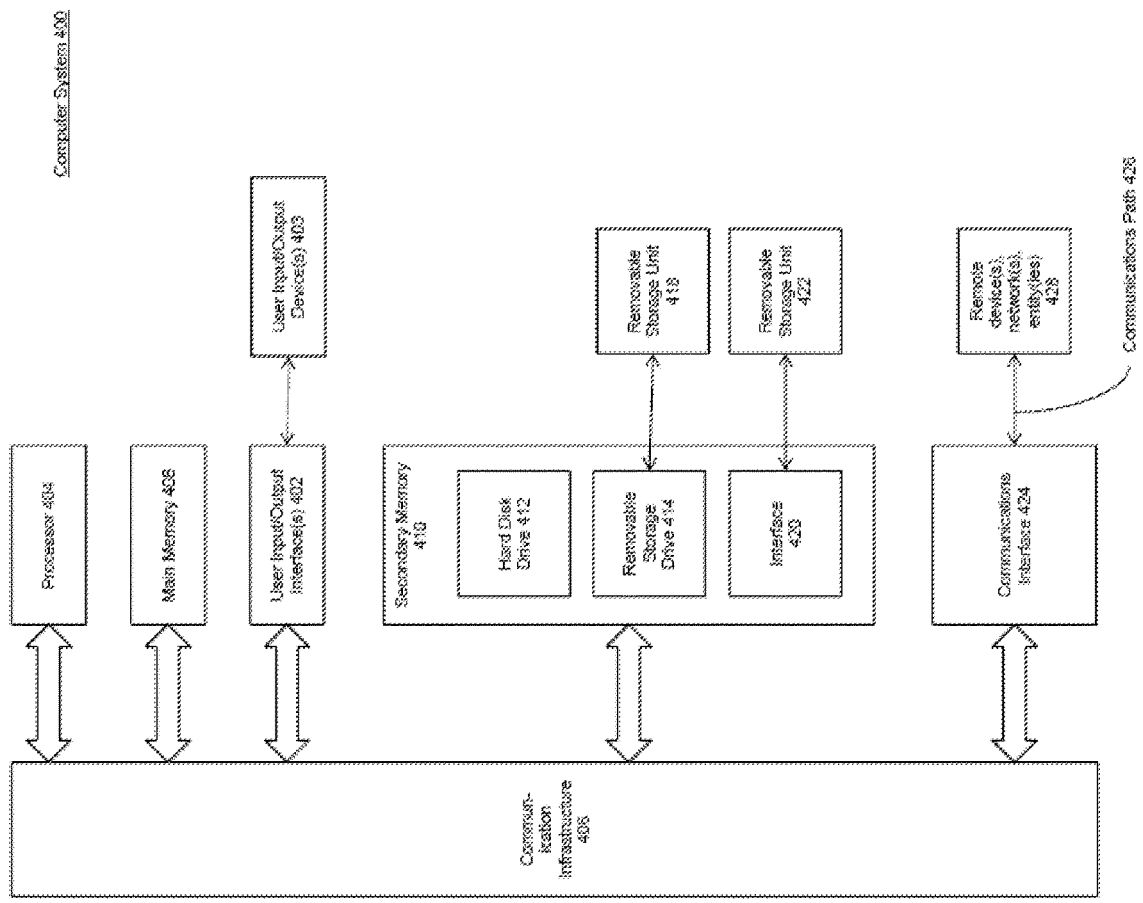
FIG. 4 depicts an exemplary computer system, according to embodiments of the present disclosure.

Various embodiments can be implemented, for example, using one or more computer systems, such as computer system 400 shown in FIG. 4. Computer system 400 can be used, for example, to implement the systems and processes described in FIGS. 1-3. Computer system 400 can be any computer capable of performing the functions described herein.

Computer system 400 can be any well-known computer capable of performing the functions described herein.

Computer system 400 includes one or more processors (also called central processing units, or CPUs), such as a processor 404. Processor 404 is connected to a communication infrastructure or bus 406.

One or more processors 404 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 also includes user input/output device(s) 403, such as monitors, keyboards, pointing devices, etc., that communicate with communication infrastructure 406 through user input/output interface(s) 402.

Computer system 400 also includes a main or primary memory 408, such as random access memory (RAM). Main memory 408 may include one or more levels of cache. Main memory 408 has stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 includes a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 reads from and/or writes to removable storage unit 418 in a well-known manner.

According to an exemplary embodiment, secondary memory 410 may include other means, instrumentalities or other approaches for allowing computer programs and/or other instructions and/or data to be accessed by computer system 400. Such means, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 enables computer system 400 to communicate and interact with any combination of remote devices, remote networks, remote entities, etc. (individually and collectively referenced by reference number 428). For example, communication interface 424 may allow computer system 400 to communicate with remote devices 428 over communications path 426, which may be wired and/or wireless, and which may include any combination of LANs, WANs, the Internet, etc. Control logic and/or data may be transmitted to and from computer system 400 via communication path 426.

In an embodiment, a tangible apparatus or article of manufacture comprising a tangible computer useable or readable medium having control logic (software) stored thereon is also referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method of validating an authorization request comprising:
    receiving, from a user, an access token, the access token having been issued by an identity provider and provided to the user;
    extracting an identity provider identifier from the access token;
    validating the access token by using the identity provider identifier as a key in a database to confirm the identity provider is a known identity provider;
    further validating the access token using keys obtained from a JSON Web Token (JWT) key set of the known identity provider;
    checking each access claim of the access token for invalidity; and
    if no invalid claims are found, accepting the authorization request.

2. The method of claim 1, further comprising:
    if any of the access claims are invalid, failing the authorization request.

3. The method of claim 1, further comprising:
    if a first access claim of the access claims is invalid and the second access claim of the access claims is valid, accepting authorization for access associated with the second access claim.

4. The method of claim 1, wherein the identity provider is provided control over only a predetermined subset of all data elements and organizations.

5. The method of claim 4, wherein the access token is invalid if any access claim of the access token falls outside the predetermined subset of all data elements and organizations available to the identity provider.

6. The method of claim 1, wherein a validated access claim provides access to less than all data elements under control of the identity provider.

7. The method of claim 1, further comprising:
    checking an expiration time in the access token is a future time.

8. The method of claim 1, wherein the authorization request is associated with a real-time location services provision.

9. A computer-implemented method for validating an authorization request, the computer-implemented method comprising:
    receiving, from a user, an access token, the access token having been issued by an identity provider and provided to the user;
    extracting an identity provider identifier from the access token;
    validating the access token by using the identity provider identifier as a key in a database to confirm the identity provider is a known identity provider;
    further validating the access token using keys obtained from a JSON Web Token (JWT) key set of the known identity provider;
    checking each access claim of the access token for invalidity; and
    if no invalid claims are found, accepting the authorization request.

10. The computer-implemented method of claim 9, further comprising:
    if any of the access claims are invalid, failing the authorization request.

11. The computer-implemented method of claim 9, further comprising:
    if a first access claim of the access claims is invalid and the second access claim of the access claims is valid, accepting authorization for access associated with the second access claim.

12. The computer-implemented method of claim 9, wherein a validated access claim provides access to less than all data elements under control of the identity provider.

13. The computer-implemented method of claim 9, further comprising:
    checking an expiration time in the access token is a future time.

14. The computer-implemented method of claim 9, wherein the authorization request is associated with a real-time location services provision.

15. A services provision system comprising at least one processor and a memory coupled to the at least one processor, the at least one processor configured to:
    receive, from a user, an access token, the access token having been issued by an identity provider and provided to the user;
    extract an identity provider identifier from the access token;
    validate the access token by using the identity provider identifier as a key in a database to confirm the identity provider is a known identity provider;
    further validate the access token using keys obtained from a JSON Web Token (JWT) key set of the known identity provider;
    check each access claim of the access token for invalidity; and
    if no invalid claims are found, accept the authorization request.

16. The services provision system of claim 15, wherein the at least one processor is further configured to:
   if any of the access claims are invalid, fail the authorization request.

17. The services provision system of claim 15, wherein the at least one processor is further configured to:
   if a first access claim of the access claims is invalid and the second access claim of the access claims is valid, accept authorization for access associated with the second access claim.

18. The services provision system of claim 15, wherein the identity provider is provided control over only a predetermined subset of all data elements and organizations.

19. The services provision system of claim 18, wherein the access token is invalid if any access claim of the access token falls outside the predetermined subset of all data elements and organizations available to the identity provider.

20. The services provision system of claim 15, wherein a validated access claim provides access to less than all data elements under control of the identity provider.

21. The services provision system of claim 15, wherein the at least one processor is further configured to:
   check an expiration time in the access token is a future time.

22. The services provision system of claim 15, wherein the authorization request is associated with a real-time location services provision.

* * * * *